United States Patent
Komiyama et al.

(10) Patent No.: US 6,864,663 B2
(45) Date of Patent: Mar. 8, 2005

(54) HYBRID VEHICLE POWER CONTROL APPARATUS AND HYBRID CONSTRUCTION EQUIPMENT USING THE POWER CONTROL APPARATUS

(75) Inventors: Masayuki Komiyama, Kobe (JP); Toshio Sora, Kobe (JP); Masato Koyama, Sanda (JP); Michio Kataoka, Kobe (JP)

(73) Assignees: Kobelco Construction Machinery Co., Ltd., Hiroshima (JP); Mitsubishi Denki Kabushiki Kaisha, Tokyo (JP)

( * ) Notice: Subject to any disclaimer, the term of this patent is extended or adjusted under 35 U.S.C. 154(b) by 38 days.

(21) Appl. No.: 10/398,203
(22) PCT Filed: Apr. 26, 2002
(86) PCT No.: PCT/JP02/04231
§ 371 (c)(1), (2), (4) Date: Apr. 7, 2003
(87) PCT Pub. No.: WO02/089310
PCT Pub. Date: Nov. 7, 2002

(65) Prior Publication Data
US 2004/0021441 A1 Feb. 5, 2004

(30) Foreign Application Priority Data
Apr. 27, 2001 (JP) ........................................ 2001-133582

(51) Int. Cl.⁷ .................................................. H02J 7/00
(52) U.S. Cl. ..................................................... 320/104
(58) Field of Search ................................ 320/104, 132; 701/22; 318/376, 139; 307/10.1

(56) References Cited

U.S. PATENT DOCUMENTS

| | | | | |
|---|---|---|---|---|
| 5,412,293 A | * | 5/1995 | Minezawa et al. | 318/376 |
| 5,428,274 A | * | 6/1995 | Furutani et al. | 318/139 |
| 5,998,960 A | * | 12/1999 | Yamada et al. | 320/104 |
| 6,223,106 B1 | * | 4/2001 | Yano et al. | 701/22 |
| 6,232,748 B1 | * | 5/2001 | Kinoshita | 320/132 |
| 6,635,973 B1 | * | 10/2003 | Kagoshima et al. | 307/10.1 |

FOREIGN PATENT DOCUMENTS

| | | |
|---|---|---|
| JP | 5-146008 | 6/1993 |
| JP | 5-146009 | 6/1993 |

(List continued on next page.)

*Primary Examiner*—Pia Tibbits
(74) *Attorney, Agent, or Firm*—Oblon, Spivak, McClelland, Maier & Neustadt, P.C.

(57) ABSTRACT

An object of the invention is to maintain high vehicle driving performance and system efficiency by preventing reductions in the traction characteristic and the maximum driving speed of a vehicle.

The invention relates to an electrical system for an electric automotive vehicle for driving the vehicle by supplying an electric power of a direct-current power supply to an electric motor for driving wheels via a semiconductor power converter for driving the wheels such as an inverter and speed-variably driving this electric motor or an electrical system for an electric automotive vehicle using an engine and a direct-current power supply as driving sources. A booster chopper 200 is connected between a battery device 1 or 4 as the direct-current power supply and an inverter 2 or a semiconductor power converter 100, and is controlled so that a direct-current input voltage of the inverter 2 or the like becomes substantially constant.

21 Claims, 8 Drawing Sheets

FOREIGN PATENT DOCUMENTS

| | | |
|---|---|---|
| JP | 10-215503 | 8/1998 |
| JP | 10-271611 | 10/1998 |
| JP | 11-103504 | 4/1999 |
| JP | 11-220812 | 8/1999 |
| JP | 11-332017 | 11/1999 |
| JP | 2000-283107 | 10/2000 |
| JP | 2000-295717 | 10/2000 |
| JP | 2001-3396 | 1/2001 |
| JP | 2001-3397 | 1/2001 |
| JP | 2001-16704 | 1/2001 |
| JP | 2001-16891 | 1/2001 |
| JP | 2001-69602 | 3/2001 |
| WO | 01/00934 | 1/2001 |

* cited by examiner

HYBRID VEHICLE POWER CONTROL APPARATUS AND HYBRID CONSTRUCTION EQUIPMENT USING THE POWER CONTROL APPARATUS

TECHNICAL FIELD

This invention relates to a power control apparatus for use in a hybrid vehicle loaded with an engine and an electric motor, and a hybrid construction machine loaded with such a power control apparatus.

BACKGROUND ART

Heretofore, there have been proposed a variety of hybrid vehicles each of which is mounted with an engine and an electric motor and which is so constructed as to drive a load by the motor, and some of these hybrid vehicles are in practical use.

For instance, there is proposed a hybrid vehicle in which a battery is charged with electric power generated from a generator by driving of an engine, and the electric motor is selectively driven either by electric power from the battery or electric power from the generator.

In the above-constructed hybrid vehicle, it is desirable to optimally control power distribution between the battery and the generator depending on electric power demanded from a load by way of the motor, considering various requirements such as securing stable operation of the engine, attaining output efficiency of the generator, and improving efficiency of the battery, and preventing deterioration of performance of the battery by suppressing generation of excessive charging/discharging currents.

As an apparatus for attaining the aforementioned power control, Japanese Unexamined Patent Publication No. 5-146008 proposes an arrangement in which an output terminal of a generator and an output terminal of a battery are respectively directly connected with a direct-current (DC) line, and output power from the generator is varied by controlling a field current of the generator in such a manner that the output voltage of the generator is set at a target value. With this arrangement, power distribution between the battery and the generator is controllably regulated.

Further, proposed is a hybrid construction machine loaded with an engine and an electric motor to drive an actuator by the motor. For instance, Japanese Unexamined Patent Publication No. 2000-283107 proposes a hybrid hydraulic excavator constructed such that power required for driving plural actuators is selectively supplied by way of the electric motor from a generator and a battery.

Generally, in a construction machine, particularly, in a hydraulic excavator for performing excavation by use of a working attachment, a load-driving torque which is to be outputted from an electric motor in order to drive an actuator (hydraulic cylinder) of the attachment is greatly varied depending on various factors such as a reactive force exerted from an object for excavation and the posture of the attachment, which resultantly increases a difference between a minimal load and a maximal load. Further, since the operating speed of each attachment is frequently adjusted by an operator, power required for driving a load is changed on time-basis. FIG. 8 illustrates an example of change of power demanded from a load with time at the time of excavating and charging by a hydraulic excavator. As is obvious from FIG. 8, power demand from a load is frequently and greatly changed between the minimal value and the maximal value.

In view of the above, even if the arrangement of the aforementioned Japanese Publication No. 5-146008 is applied to a hybrid vehicle in which power demand from a load is greatly changed, e.g. hybrid construction machine, the following matters should be considered because the above publication has the arrangement that the output terminal of the generator and the output terminal of the battery (storage device) are respectively directly connected with a DC line:

i) output distribution between the generator and the battery is determined based on a relation between a terminal voltage of the generator (battery), and an output impedance during a rise-up period until control keeps up with the change of the power demand; and ii) the voltage and the current of the DC line greatly fluctuate depending on accumulated electric energy and the level of charging/discharging currents of the battery.

Due to the reason i), it is highly likely that the hybrid construction machine adopting the arrangement of the aforementioned publication may encounter an uncontrollable state if the power demand from the load is drastically changed. As a result, excessive power may be supplied from the generator, which may increase burden on the engine for driving the generator. Then, it is highly likely that fuel consumption rate or fuel efficiency of the engine may be lowered, or in a worst case, driving of the engine may be forcibly suspended owing to overload of the engine. Further, power loss due to internal resistance of the battery may be increased, or performance of the battery may be deteriorated owing to increase of charging/discharging currents of the battery.

Generally, means for driving a motor is electrically connected with a DC line. Considering a withstand voltage or a withstand current of a circuit element (e.g. semiconductor switches and diodes such as MOS-FETs or IGBTs) used in such motor-driver, it is required to adopt an element whose rated voltage is higher than the maximal value of the voltage of the DC line and whose rated current is regulated in accordance with the output current of the motor-driver.

Due to the reason ii), as the maximal voltage of the DC line increases, a circuit element having a high withstand voltage is required. As a result, the cost of the circuit element is raised, and the motor-driver becomes expensive. Further, if demanded power from the load is to be supplied in the above arrangement by way of the motor in an attempt to cope with a condition that the voltage of the DC line is lowered, the output current of the motor-driver is increased. In view of this, a circuit element having a large current capacity is required. Therefore, as with the former case, the cost for the circuit element is raised, which makes the motor-driver expensive. Furthermore, as the output current of the motor-driver increases, switching loss of a semiconductor switching element increases, which resultantly increases calorific power. Accordingly, the size of the motor-driver becomes large owing to increase of the size of cooling means such as a heat sink which is mounted on the semiconductor switching element. As a result, the motor-driver in its entirety becomes large, and a large space is required to load such a large motordriver in a hybrid vehicle.

In view of the above, it is an object of the invention to solve the aforementioned problems residing in the prior art and to provide a power control apparatus for use in a hybrid vehicle that enables to allow a generator and storage device to optimally supply power just enough for demanded power from a load even in the case where the demanded power from the load by way of an electric motor is drastically changed, and a hybrid construction machine loaded with such a power control apparatus.

It is another object of the invention to provide a power control apparatus for use in a hybrid vehicle that enables to improve charging/discharging efficiency of storage device, to prevent deterioration of performance of the storage device, and to downsize the power control apparatus, and a hybrid construction machine loaded with such a power control apparatus.

DISCLOSURE OF THE INVENTION

One aspect of the invention is directed to a power control apparatus for use in a hybrid vehicle provided with an engine, a generator driven by the engine, at least one storage device, an electric motor which is driven by power supplied from at least one of the generator and the storage device, and a load which is operated by the motor as a drive source. The power control apparatus comprises: first power converter which is provided between the generator and a direct-current (DC) line for converting the power outputted from the generator to DC power to output the DC power to the DC line; at least one second power converter which is provided between the storage device and the DC line for converting the power outputted from the storage device to DC power to output the DC power to the DC line; motor driver which is electrically connected with the DC line for driving the motor based on the power supplied by way of the DC line; and power controller for controlling the first power converter and the second power converter to output DC power corresponding to demanded power from the load by way of the motor to the DC line, wherein the power controller controls the first power converter and the second power converter to maintain a voltage of the DC line at a substantially constant level irrespective of variation of the power demand from the load.

In the above arrangement, the first power converter is provided between the generator and the DC line, and the second power converter is provided between the storage device and the DC line, and the first power converter and the second power converter are controlled to output the DC power corresponding to the demanded power from the motor-driver to the DC line. With this arrangement, even if power demand from the load by way of the motor is abruptly changed, power just enough for the demanded power is supplied from the generator or from the storage device. Since the voltage of the DC line is maintained at a substantially constant level, there is no need of considering level variation of current or voltage. Thereby, this arrangement facilitates setting of the voltage rating and current rating of circuit elements used in the first power converter, the second power converter, and the motor-driver, and makes it possible to produce the circuit element, and the first and second power converter and the motor-driver incorporated with such a circuit element with a reduced size and at a low cost.

Another aspect of the invention has a feature that the power controller controls the first power converter to output the DC power of a value not larger than a predetermined value. This arrangement can obviate drawbacks such as lowering of fuel efficiency due to increase of a burden to the engine for driving the generator beyond a predetermined level, and forcible suspension of driving of the engine due to overload of the engine.

Another aspect of the invention has a feature that the power controller controls the storage device to discharge an electric current of a value not larger than a predetermined value and to charge an electric current of a value not larger than predetermined values. This arrangement can obviate drawbacks such as lowering of charging/discharging efficiency due to increase of the charging/discharging currents of the storage device beyond the predetermined values, respectively, deterioration of performance of the storage device, and shortening of the useful life of the storage device.

Another aspect of the invention has a feature that the power controller controls the second power converter to output the DC power in such a manner that the storage device outputs a DC voltage of a value not larger than a predetermined value. In this arrangement, obviated are drawbacks such as deterioration of performance of the storage device and breakage thereof by setting the DC voltage at a value not larger than a withstand voltage of the storage device. This arrangement makes it possible to adopt a component such as an electric double layer capacitor in which a terminal voltage is greatly varied depending on accumulated electric energy of the storage device, as the storage device.

Another aspect of the invention has a feature that the power controller controls the second power converter to output the DC power in such a manner that said storage device outputs a DC voltage of a value not smaller than a predetermined value. According to this arrangement, since there is no likelihood that the terminal voltage of the storage device is not larger than the predetermined value, this arrangement can obviate a phenomenon that the terminal voltage is greatly lowered with the result that charging/discharging efficiency of the storage device is lowered due to increase of input/output current at the time of inputting/outputting constant power. This arrangement makes it possible to adopt a component such as an electric double layer capacitor in which a terminal voltage is greatly varied depending on accumulated electric energy of the storage device, as the storage device.

Another aspect of the invention has a feature that the power controller controls the second power converter to output the DC power in such a manner that electric energy stored in the storage device lies in a predetermined range. This arrangement can obviate drawbacks such as deterioration of performance of the storage device due to excessive charging or excessive discharging, and breakage of the storage device.

Another aspect of the invention has a feature that: the power controller includes a first controller for sending an electrical command signal to the first power converter, and a second controller for sending an electrical command signal to the second power convener; the first power converter outputs the DC power responsive to the electrical command signal from the first controller; the second power converter outputs the DC power responsive to the electrical command signal from the second controller; and the first controller and the second controller respectively send the electrical command signals that are operative to maintain the voltage of the DC line at a substantially constant level.

In the above arrangement, the first controller is allowed to send an electrical command signal, e.g., a current command value, which enables to maintain the voltage of the DC line at a substantially constant level, to the first power converter, which in turn outputs the DC power corresponding to the inputted electrical command signal, and the second controller is allowed to send an electrical command signal, e.g., a current command value, which enables to maintain the voltage of the DC line at a substantially constant level, to the second power converter, which in turn outputs the DC power corresponding to the inputted electrical command signal. This arrangement secures power supply from the generator or from the storage device just enough for the demanded power from the motor.

Another aspect of the invention has a feature that the power control apparatus further comprises a plurality of storage device, and a plurality of second power converter corresponding to the plurality of storage device in number. In this arrangement, since the plurality of second power convener are provided between the respective corresponding storage device and the DC line, power supplying and receiving among the plurality of storage device does not occur. This arrangement can obviate lowering of control efficiency of the power control apparatus as a whole due to energy loss resulting from such power supplying and receiving.

Another aspect of the invention has a feature that, in the arrangement of claim 8, the power controller controls the plurality of second power converter in accordance with a predetermined order of priority based on input/output characteristics of each of the plurality of storage device. This arrangement provides optimal power distribution depending on the input/output characteristics of each storage device.

Another aspect of the invention has a feature that the load of the power control apparatus includes an actuator for actuating a working attachment mounted on a main body of the hybrid vehicle. In this arrangement, even if power demand from the actuator by way of the motor is frequently and greatly varied, power just enough for the demanded power is suppliable from the generator or from the storage device.

Another aspect of the invention has a feature that a hybrid construction machine is incorporated with the power control apparatus for use in the hybrid vehicle as set forth in any one of claims 1 to 9 and that the load of the hybrid construction machine includes an actuator for actuating a working attachment mounted on a main body of the hybrid construction machine.

In the above arrangement, provided is a hybrid construction machine which enables to carry out power supply just enough for the demanded power from the generator or from the storage device even if the power demand from the actuator by way of the motor is frequently and greatly varied.

BEST MODE FOR CARRYING OUT THE INVENTION

Hereinafter, preferred embodiments of the invention are described with reference to FIGS. 1 through 7.

(a) First Embodiment

Figure 1:
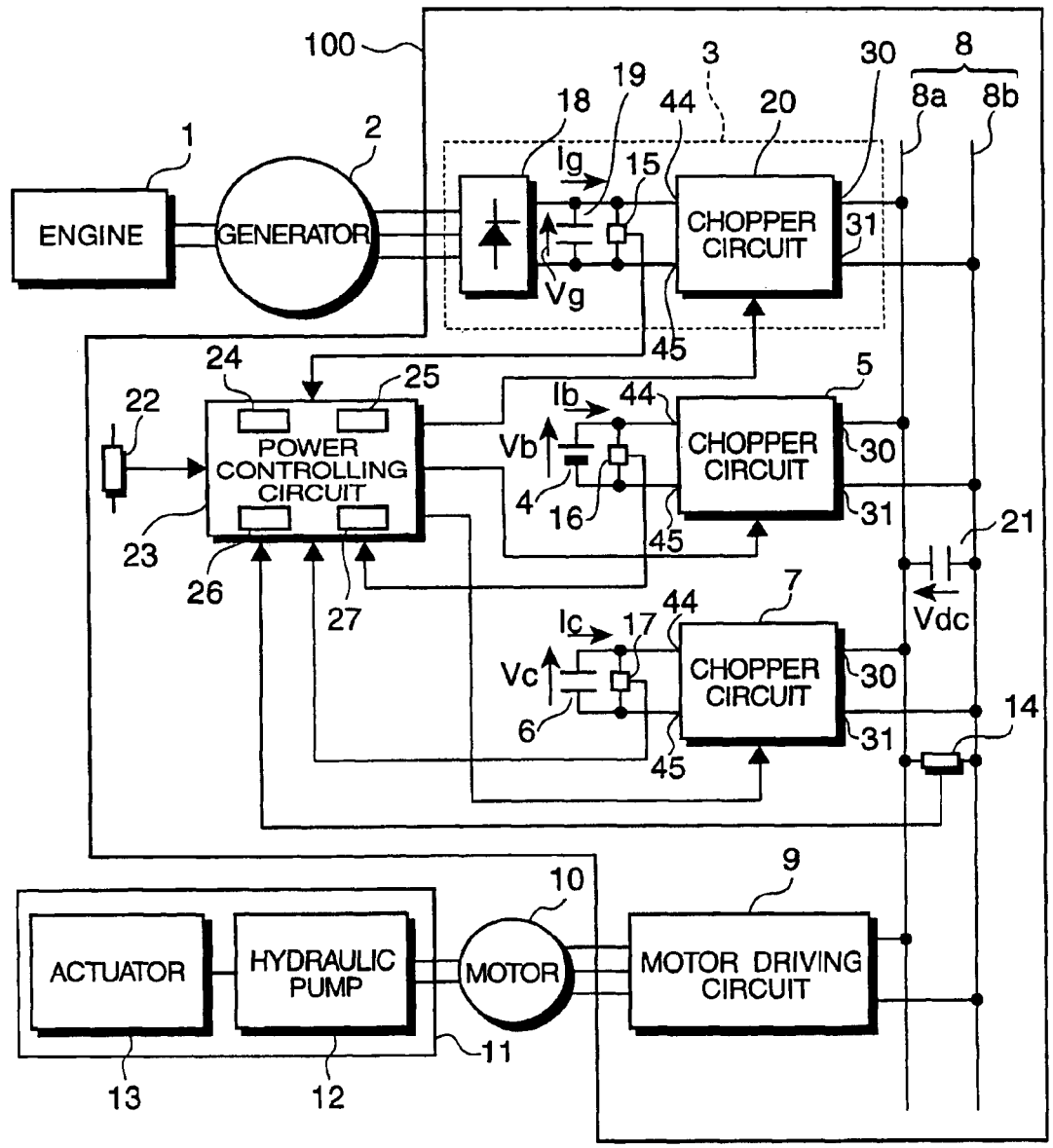
FIG. 1 is a circuit block diagram showing an electrical configuration of a first embodiment of a power control apparatus for use in a hybrid vehicle in accordance with the invention.

A power control apparatus in accordance with the first embodiment of the invention is comprised of, as shown in FIG. 1, an engine 1, an alternate-current (AC) generator 2, an electric motor 10, a load 11, and an electric circuit section 100.

The engine 1 is directly connected with the AC generator 2. The AC generator 2 outputs three-phase AC power by being driven by the engine 1.

The motor 10 may be an induction motor, a direct-current (DC) motor, a synchronous motor, or its equivalent.

The load 11 includes a hydraulic pump 12 and an actuator 13. The hydraulic pump 12 is drivingly rotated by the motor 10. The actuator 13 includes a hydraulic cylinder which is operated by pressure oil fed from, e.g. the hydraulic pump 12. The actuator 13 is used to drive a working attachment such as a boom and an arm.

The electric circuit section 100 is configured in such a manner that a circuit 3 for converting power of the generator 2 (a generator power converting circuit 3) has an input connected with an output terminal of the AC generator 2 and an output connected with a direct-current (DC) line 8 consisting of a power line 8a and a ground line 8b.

The generator power converting circuit 3 includes a rectifying circuit 18, a smoothing capacitor 19, and a chopper circuit 20. After being rectified by the rectifying circuit 18, smoothed by the smoothing capacitor 19, and DC-DC converted by the chopper circuit 20, AC voltage from the AC generator 2 is outputted to the DC line 8.

Output terminals 30, 31 of the chopper circuit 20 are respectively connected with the power line 8a and the ground line 8b, and input terminals 44, 45 thereof are respectively connected with the opposite electrodes of the smoothing capacitor 19. The configuration of the chopper circuit 20 will be described later.

The generator power converting circuit 3 includes a voltage detecting circuit 15 for detecting a DC voltage which has been smoothed by the smoothing capacitor 19. The result of detection by the voltage detecting circuit 15 is outputted to a power control circuit 23 for calculation.

The chopper circuit 5 has output terminals 30, 31 respectively connected with the power line 8a and the ground line 8b, and input terminals 44 and 45 respectively connected with the positive electrode and the negative electrode of a battery 4. The configuration of the chopper circuit 5 is substantially identical to that of the chopper circuit 20. The chopper circuit 5 is DC-DC converted between the battery 4 and the DC line 8 to charge and discharge the battery 4.

A voltage detecting circuit 16 is connected between the opposite electrodes of the battery 4 to detect a battery voltage Vb. The result of detection by the voltage detecting circuit 16 is outputted to the power control circuit 23 for calculation.

The chopper circuit 7 has output terminals 30, 31 respectively connected with the power line 8a and the ground line 8b, and input terminals 44 and 45 respectively connected with the opposite electrodes of a capacitor 6. The configuration of the chopper circuit 7 is substantially identical to that of the chopper circuit 20. The chopper circuit 7 is DC-DC converted between the capacitor 6 and the DC line 8 to charge and discharge the capacitor 6.

A voltage detecting circuit 17 is connected between the opposite electrodes of the capacitor 6 to detected a capacitor voltage Vc. The result of detection by the voltage detecting circuit 17 is outputted to the power control circuit 23 for calculation.

A motor driving circuit 9 has inputs respectively connected with the power line 8a and the ground line 8b of the DC line 8, and outputs connected with the motor 10. The motor driving circuit 9 drives the motor 10 based on power supplied from at least one of the AC generator 2, the battery 4, and the capacitor 6 via the DC line 8. The motor driving circuit 9 has such a circuit configuration as to conform with the type of the motor 10 such as an induction motor, a DC motor, and a synchronous motor.

A voltage detecting circuit 14 is connected between the power line 8a and the ground line 8b to detect a DC voltage. The result of detection by the voltage detecting circuit 14 is outputted to the power control circuit 23 for calculation. A smoothing capacitor 21 is connected between the power line 8a and the ground line 8 to smooth a higher harmonic wave component included in a DC output voltage from the chopper circuits 5, 7, 20.

A DC voltage command setter 22 sets a DC voltage which is to be generated between the power line 8a and the ground line 8b as a DC voltage command value Vdc*, and sends the value Vdc* to the power control circuit 23. The DC voltage command value Vdc* is preset based on rating of the motor 10, a withstand voltage of an element constituting the motor driving circuit 9, or the like.

Figure 2:
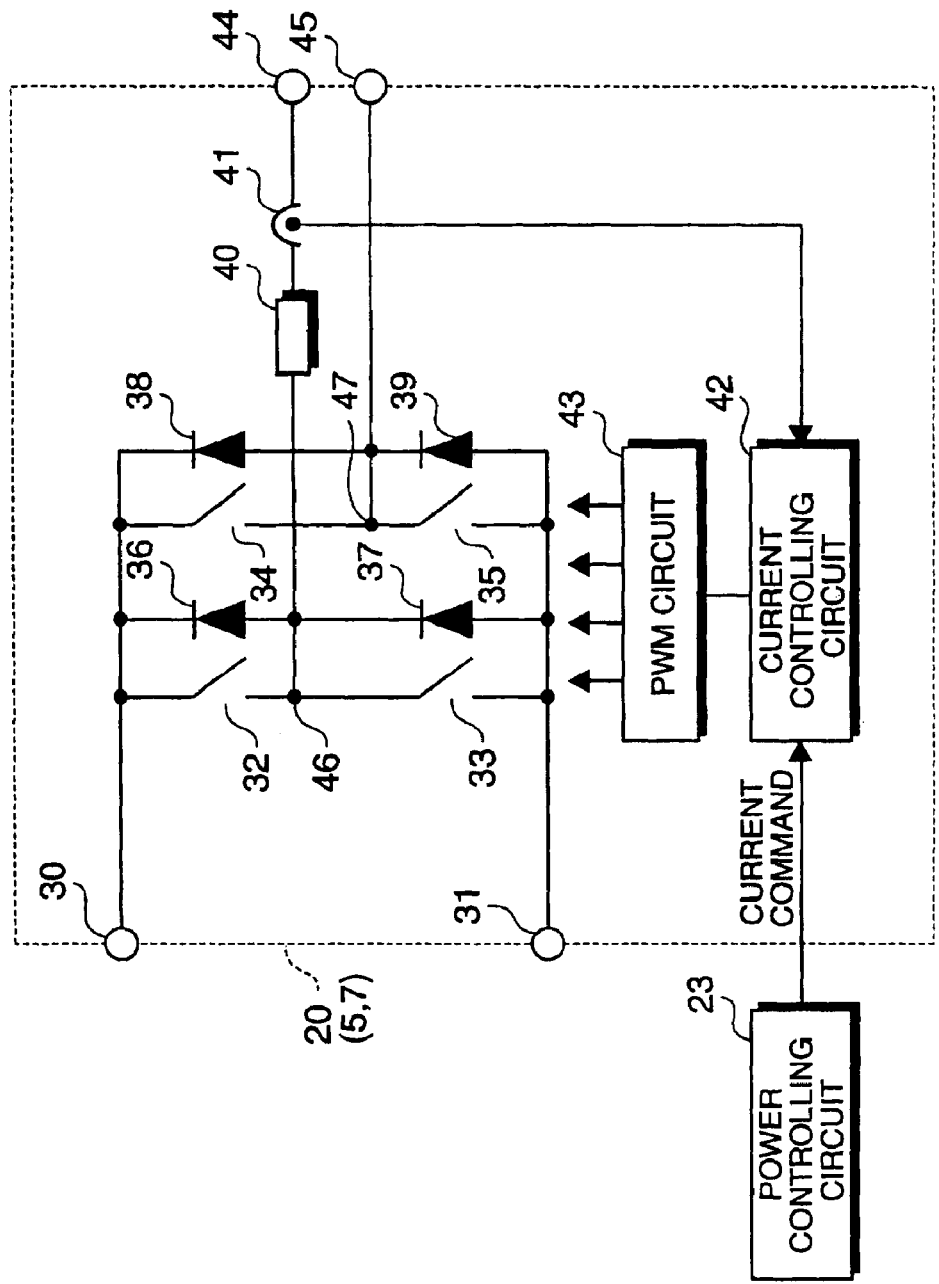
FIG. 2 is a circuit block diagram showing an electrical configuration of a chopper circuit in FIG. 1.

In the case where the voltage Vb of the battery 4 and the voltage Vc of the capacitor 6 are higher than a voltage Vdc of the DC line 8, diodes 36 to 39 in the chopper circuit, which will be described later in FIG. 2, are electrically communicable with each other, which makes it impossible to control the output current by the chopper circuits 20, 5, 7. In view of this, the voltage Vdc of the DC line 8 is required to be set higher than the maximal voltage of the battery 4 and the maximal voltage of the capacitor 6.

Now, the configuration of the chopper circuit 20 (5 or 7) is described with reference to FIG. 2. The chopper circuits 20, 5, 7 are each provided with semiconductor switching elements 32 to 35, the diodes 36 to 39 which are respectively back-to-back connected with the semiconductor switching elements 32 to 35, a reactor 40, a current detecting circuit 41, a current controlling circuit 42, and a pulse width modulation (PWM) circuit 43.

The semiconductor switching elements 32 to 35 are each turned on and off in response to a control signal inputted to a control end (not shown) thereof. Examples of the semiconductor switching elements 32 to 35 are semiconductor elements to be used under large power conditions such as IGBTs and MOS-FETs. The reactor 40 is adapted to smooth an electric current. The current detecting circuit 41 is comprised of a hall element or a low resistance element, and is adapted to detect a current flowing in the reactor 40, namely, an input current of the chopper circuit 20. The result of detection by the current detecting circuit 41 is outputted to the current controlling circuit 42.

The current controlling circuit 42 compares the detected current value outputted from the current detecting circuit 41 with a current command value outputted from the power control circuit 23, and sends a DC voltage command value that causes the detected current value to follow the current command value, to the PWM circuit 43.

The PWM circuit 43 outputs to each of the semiconductor switching elements 32 to 35 an on/off control signal that makes a DC voltage between a connecting point 46 of the semiconductor switching elements 32, 33, and a connecting point 47 between the semiconductor switching elements 34, 35 (namely, an input voltage in the chopper circuit 20 or 5 or 7) coincident with the DC voltage command value outputted from the current controlling circuit 42.

With the above configuration, the current flowing in the reactor 40 is so regulated as to coincide with the current command value outputted from the power control circuit 23.

As shown in FIG. 1, the current flowing in the reactor 40 of the chopper circuit 20 is a generator current Ig which flows between the chopper circuit 20 and the smoothing capacitor 19, the current flowing in the reactor 40 of the chopper circuit 5 is a battery current Ib which flows between the chopper circuit 5 and the battery 4, and the current flowing in the reactor 40 of the chopper circuit 7 is a capacitor current Ic which flows between the chopper circuit 7 and the capacitor 6.

Assuming that the currents Ib, Ic flow in the directions shown by the arrows in FIG. 1, the currents Ib, Ic become discharging currents, respectively when Ib>0, Ic>0, whereas the currents Ib, Ic become charging currents, respectively when Ib<0, Ic<0.

The chopper circuit 20 (or 5 or 7) shown in FIG. 2 is a well-known full-bridge chopper circuit, and is so configured as to allow the reactor 40 to flow the current either in positive or negative direction desirably by controlling on/off operations of the semiconductor switching elements 32 to 35.

Referring back to FIG. 1, the power control circuit 23 includes an A/D converting circuit 24, a D/A converting circuit 25, a memory 26 comprised of an RAM and an ROM, and a CPU 27. The CPU 27 controls operations of the respective elements of the power control apparatus in accordance with a control program stored in the memory 26. The CPU 27 has the following functions I), II):

I) function of receiving the DC voltage command value Vdc* which has been set by the DC voltage command setter 22, and receiving, by way of the A/D converting circuit 24, the DC voltages Vdc of the DC line 8 which have been detected by the voltage detecting circuits 14 through 17, a voltage Vg detected at the opposite ends of the smoothing capacitor 19, the battery voltage Vb of the battery 4, and the capacitor voltage Vc of the capacitor 6 to calculate a generator current command value Ig*, a battery current command value Ib*, and a capacitor current command value Ic*; and II) sending the calculated generator current command value Ig*, battery current command value Ib*, and capacitor current command value Ic* to the chopper circuits 20, 5, 7, respectively by way of the D/A converting circuit 25. Control procedures of the respective functions I), II) will be described later.

In the above configuration, the generator power converting circuit 3 (chopper circuit 20) constitutes first power converter, the battery 4 and the capacitor 6 respectively constitute storage device, and the chopper circuits 5, 7 respectively constitute second power converter. In this embodiment, the capacitor 6 is, for instance, an electric double layer capacitor.

Figure 3:
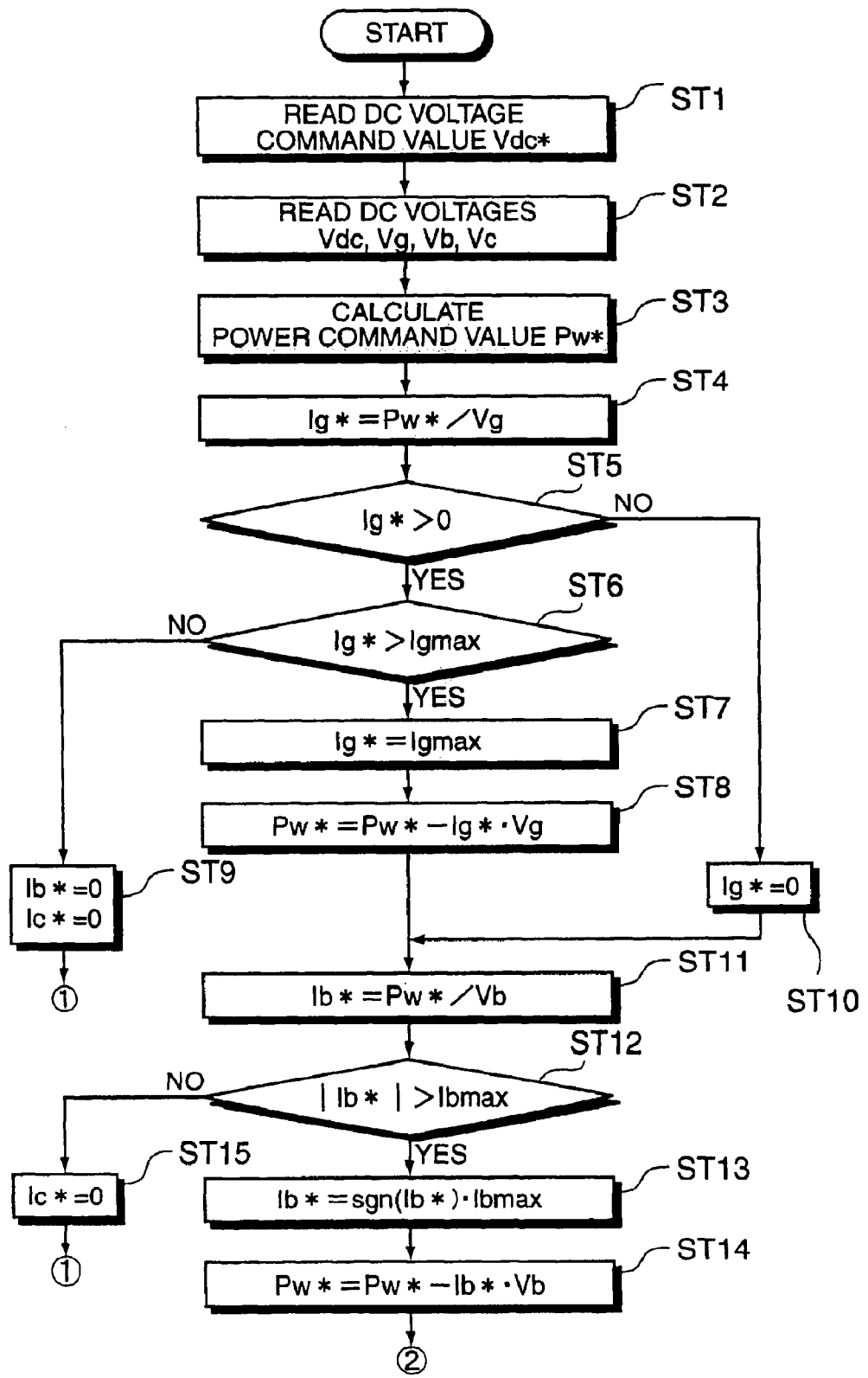
FIG. 3 is a flowchart showing a first half of a control procedure of a CPU of a power control circuit in the first embodiment of the invention.
Figure 4:
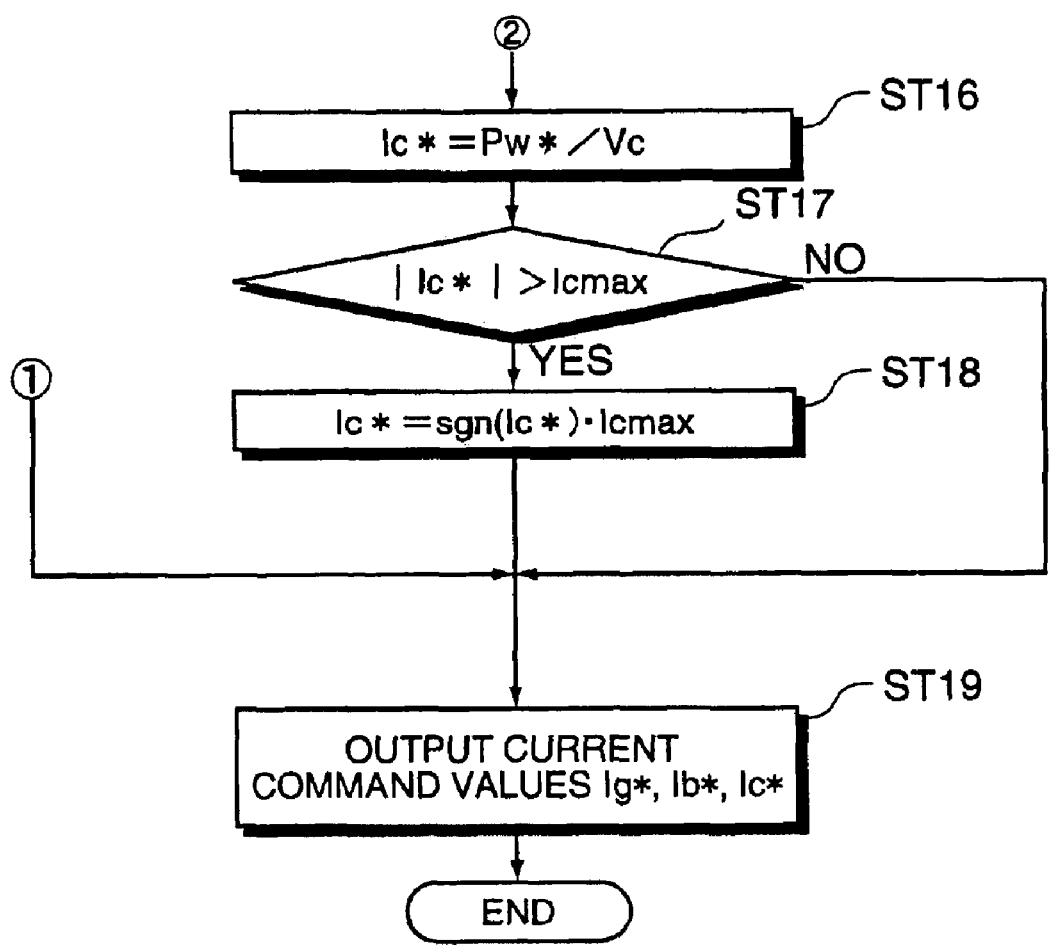
FIG. 4 is a flowchart showing a second half of the control procedure of the CPU of the power control circuit in the first embodiment of the invention.

FIGS. 3 and 4 are flowcharts showing a control procedure of the CPU 27 of the power control circuit 23 in the first embodiment.

First, the DC voltage command value Vdc* is received (in Step 1, hereinafter, Step is called as "ST" such as "ST1"), and then the DC voltage Vdc of the DC line 8, the voltage Vg detected at the opposite ends of the smoothing capacitor 19, the battery voltage Vb of the battery 4, and the capacitor voltage Vc of the capacitor 6 are received (in ST2) to be respectively stored in the memory 26.

Next, the following computation is carried out in ST3 by use of the received DC voltage command value Vdc* and the DC voltage Vdc of the DC line 8 to obtain a power command value Pw*:

$$\Delta Vdc = Vdc^* - Vdc \quad (1)$$

$$Pw\_p = Kp \cdot \Delta Vdc \quad (2)$$

$$Pw\_I = Pw\_I + Ki \cdot \Delta Vdc \quad (3)$$

$$Pw^* = Pw\_p + Pw\_I \quad (4)$$

It should be appreciated that the above equations (1) through (4) are known mathematical expressions for implementing digital PI (proportional integration), and Kp, Ki are each a proportionality constant.

Next, in ST4, a generator current command value Ig* to be outputted to the chopper circuit 20 of the generator power converting circuit 3 is calculated by implementing the equation (5):

$$Ig^* = Pw^*/Vg \quad (5)$$

Here, the generator power Pw which is supplied from the AC generator 2 to the DC line 8 by way of the chopper circuit 20 is equal to the product of the generator current Ig which flows between the chopper circuit 20 and the smoothing capacitor 19, and the voltage Vg detected at the opposite ends of the smoothing capacitor 19.

Namely, $$Pw = Ig \cdot Vg \quad (6)$$

It should be noted that although there exists, in a strict sense, power which is consumed in terms of heat in the chopper circuit 20, such power consumption is negligible because the consumed power is insignificantly small.

Conversely, if the power command value Pw* is obtained by implementing the equation (6), the generator current command value Ig* is calculated by implementing the equation (5).

Next, in ST5, it is judged whether the polarity of the generator power is positive or negative. As shown in FIG. 1, in this embodiment, the diode rectifying circuit 18 and the smoothing capacitor 19 are used to convert an AC output voltage of the AC generator 2 to a DC voltage. If power is supplied from the DC line 8 to the smoothing capacitor 19 by way of the chopper circuit 20, there may occur a drawback that the voltage of the smoothing capacitor 19 is undesirably raised. In view of this drawback, it is required to set the generator power at 0 when the polarity of the generator power is negative based on an assumption that the polarity of the generator power is positive in feeding the power from the smoothing capacitor 19 to the DC line 8, and the polarity thereof is negative in feeding the power from the DC line 8 to the smoothing capacitor 19.

In view of the above, in ST5 of FIG. 3, the polarity of the generator power is judged by judging whether Ig*>0.

Specifically, if Ig*≦0 (NO in ST5), the generator power is set at 0 by setting Ig*=0 (n ST10), and the routine proceeds to ST11. In ST5, the generator current command value Ig* is used to judge the polarity of the generator power in place of the power command value Pw*. Since the polarity of the generator power is not changed because the voltage Vg detected at the opposite ends of the smoothing capacitor 19 is a DC voltage, this arrangement can obviate the drawback that the voltage of the smoothing capacitor 19 may be undesirably raised.

On the other hand, if Ig*>0 in ST5 (YES in ST5), it is judged whether the calculated generator current command value Ig* exceeds a predetermined limit Igmax (in ST6). If it is judged that Ig* exceeds the limit Igmax (Ig*>Igmax) (YES in ST6), the limit Igmax is set as the generator current command value Ig*(Ig*=Igmax) (in ST7).

Thus, the maximal value of the generator power Pw is controllably regulated by setting the upper limit of the generator current command value Ig* at a value not larger than the limit Igmax. With this arrangement, since there is no likelihood that the power to be supplied from the AC generator 2 to the DC line 8 becomes excessively large, this arrangement can obviate drawbacks such as lowering of the fuel efficiency due to increase of a load of the engine 1, and forcible suspension of driving of the engine 1 due to overload of the engine 1.

Subsequently, in ST8, by implementing the equation (7), the power command value Pw* is redefined by subtracting the maximal value of the generator power, i.e. Igmax·Vg (=Ig*·Vg) from the power command value Pw*, and the routine goes to ST11:

$$Pw^* = Pw^* - Ig^* \cdot Vg \quad (7)$$

The redefined power command value Pw* represents power in shortage corresponding to a difference between the maximal value of the generator power and demanded power from the load. As will be described later, power corresponding to the redefined power command value Pw* is supplied either from the battery 4 or from the capacitor 6, or both from the battery 4 and the capacitor 6.

On the other hand, if the current command value Ig* does not exceed the limit Igmax (Ig*≦Igmax) in ST6 (NO in ST6), the generator power is sufficiently large to provide demanded power from the load. Accordingly, the command value Ib* of the battery current which flows between the battery 4 and the chopper circuit 5, and the command value Ic* of the capacitor current which flows between the capacitor 6 and the chopper circuit 7 are respectively set at 0 (in ST9), and the routine goes to ST19.

Next, in ST11, the battery current command value Ib* is calculated by implementing the equation (8) in a similar manner as in ST4:

$$Ib^* = Pw^*/Vb \quad (8)$$

Next, in ST12, it is judged whether the amplitude (absolute value) of the battery current command value Ib* exceeds a predetermined limit Ibmax. If it is judged that the amplitude exceeds the limit Ibmax (|Ib*|>Ibmax) (YES in ST12), the following equation (9) is implemented to set the limit Ibmax as the battery current command value Ib* (in ST13):

$$Ib^* = \text{sgn}(Ib^*) \cdot Ib\text{max} \quad (9)$$

In the equation (9), sgn(Ib*) denotes a signal indicative of the polarity of the battery current command value Ib*. If Ib*≧0, sgn(Ib*) is +1, whereas if Ib*<0, sgn(Ib*) is −1.

Thus, the battery current Ib, namely, the maximal value of charging/discharging currents of the battery 4 is controllably regulated by setting the upper limit of the amplitude of the battery current command value Ib* at a value not larger than the limit Ibmax. This arrangement can obviate drawbacks such as shortening of the useful life of the battery 4 and lowering of charging/discharging efficiency of the battery 4.

Next, in ST14, the power command value Pw* is redefined by subtracting the maximal value of the battery power, namely, Ib*·Vb, from the power command value Pw* by implementing the equation (10), and the routine goes to ST16:

$$Pw^* = Pw^* - Ib^* \cdot Vb \qquad (10)$$

The redefined power command value Pw* represents power in shortage corresponding to a difference between the sum of the maximal value of the generator power and the maximal value of the battery power, and demanded power from the load. As will be described later, in this embodiment, power corresponding to the redefined power command value Pw* is supplied from the capacitor 6.

On the other hand, in ST12, if the current command value Ib* does not exceed the limit Ibmax in ST12 (Ib*≦Ibmax) (NO in ST12), the sum of the generator power and the battery power is sufficiently large to provide the demanded power from the load. Accordingly, the command value Ic* of the capacitor current which flows between the capacitor 6 and the chopper circuit 7 is set at 0 (in ST15), and the routine proceeds to ST19.

Next, in ST16, the capacitor current command value Ic* is calculated by implementing the equation (11) in a similar manner as in ST4:

$$Ic^* = Pw^*/Vc \qquad (11)$$

Next, in ST17, it is judged whether the amplitude (absolute value) of the capacitor current command value Ic* exceeds a predetermined limit Icmax. If it is judged that the amplitude exceeds the limit Icmax (|Ic*|>Icmax) (YES in ST17), the limit Icmax is set as the capacitor current command value Ic* by implementing the equation (12) (in ST18):

$$Ic^* = \operatorname{sng}(Ic^*) \cdot Icmax \qquad (12)$$

It should be noted that, in the equation (12), sgn(Ic*) denotes a signal indicative of the polarity of the battery current command value Ic*. If Ic*≧0, sgn(Ic*) is +1, whereas if Ic*<0, sgn(Ic*) is −1.

In this way, the capacitor current Ic, namely, the maximal value of charging/discharging currents of the capacitor 6 is controllably regulated by setting the upper limit of the amplitude of the capacitor current command value Ic* at a value not larger than the limit Icmax. This arrangement can obviate drawbacks such as shortening of the useful life of the capacitor 6 and lowering of charging/discharging efficiency of the capacitor 6.

Next, in ST19, the generator power command value Ig*, the battery current command value Ib*, and the capacitor current command value Ic*, all of which have been obtained according to the aforementioned steps, are sent to the chopper circuits 20, 5, 7, respectively by way of the power control circuit 23.

In the CPU 27 of the power control circuit 23, the control procedure shown in FIGS. 3 and 4 are cyclically repeated at a predetermined cycle (ranging from several microseconds to several ten microseconds, e.g. 15 microseconds.).

Now, the entire operation of the first embodiment is described referring to FIGS. 1 through 4.

First, when the consumption power of the load 11 is varied in response to an operation of the load 11, power to be supplied and received between the DC line 8 and the load 11 by way of the motor 10 and the chopper circuit 20 is varied. As a result, power to be supplied to the load 11 from the DC line 8, and power to be supplied to the DC line 8 from the AC generator 2, the battery 4, and the capacitor 6 respectively by way of the chopper circuits 20, 5, 7 are differentiated from each other. Thereby, the smoothing capacitor 21 is charged and discharged, with the result that the voltage Vdc of the DC line 8 is varied.

In view of the above, the CPU 27 of the power control circuit 23 calculates the power command value Pw* that enables to offset such a voltage variation in steps ST1 through ST3 in FIG. 3. For instance, as a result of variation of the voltage Vdc of the DC line 8, the power command value Pw* is increased.

Subsequently, it is judged, in steps ST4 through ST10, whether power corresponding to the power command value Pw* is sufficiently suppliable solely from the AC generator 2. If it is judged that such power is suppliable from the AC generator 2, a generator current command value Ig* corresponding to the power command value Pw* is calculated, and the calculated generator current command value Ig* is sent from the power control circuit 23 to the chopper circuit 20, which in turn controls the generator current Ig to coincide with the generator current command value Ig*. As a result of the control, power to be outputted from the chopper circuit 20 is increased, whereby the voltage Vdc of the DC line 8 is controllably rendered coincident with the DC voltage command value Vdc*. In the case where the polarity of the power command value Pw* is negative, as described above, the generator current command value Ig* is set at 0.

On other hand, in the case where power from the AC generator 2 is not sufficiently large to provide power corresponding to the power command value Pw*, in steps ST11 through ST15, it is judged whether power corresponding to a difference between the power command value Pw* and the generator power (=Ig·Vg) is suppliable solely from the battery 4. If it is judged that the power is suppliable from the battery 4, a battery current command value Ib* corresponding to the aforementioned difference is calculated, and the calculated battery current command value Ib* is sent from the power control circuit 23 to the chopper circuit 5, which in turn controls the battery current Ib to coincide with the calculated battery current command value Ib*. As a result of the control, the sum of output voltages from the chopper circuits 20 and 5 is increased, whereby the voltage Vdc of the DC line 8 is controllably rendered coincident with the voltage command value Vdc*.

Further, in the case where the sum of the powers from the AC generator 2 and the battery 4 is not sufficiently large to provide power corresponding to the power command value Pw*, in steps ST16 through ST19 in a similar manner as mentioned above, a capacitor current command value Ic* is calculated in such a manner as to allow the capacitor 6 to supply power in shortage, the calculated command value Ic* is sent from the power control circuit 23 to the chopper circuit 7, which in turn controls the capacitor current Ic to coincide with the capacitor current command value Ic*. As a result of the control, the sum of output voltages from the chopper circuits 20, 5, 7 is increased, whereby the voltage Vdc of the DC line 8 is controllably rendered coincident with the voltage command value Vdc*.

By implementing the above operations, even if power demanded from the load 11 is varied, the voltage Vdc of the DC line 8 is securely maintained at a constant level.

Thus, according to the first embodiment, the chopper circuits 20, 5, 7 are provided respectively between the DC line 8, and the AC generator 2, the battery 4, and the capacitor 6, calculated is the power command value Pw* required for retaining the voltage Vdc of the DC line 8 at the voltage command value Vdc*, and calculated are the generator current command value Ig*, the battery current command value Ib*, and the capacitor current command value Ic* required for satisfying the power command value Pw* to thereby controllably flow currents corresponding to the current command values Ig*, Ib*, Ic* in the chopper circuits 20, 5, 7, respectively. With this arrangement, even if the power demand from the load 11 is greatly varied, the voltage Vdc of the DC line 8 can be maintained at a substantially constant value, namely, at a value approximate to the voltage command value Vdc*.

The above arrangement eliminates necessity of adopting elements having high durability as circuit elements including the semiconductor switching elements 32 through 35 used in the chopper circuits 20, 5, 7, and a circuit element used in the motor-driving circuit 9. Accordingly, the chopper circuits 20, 5, 7, and the motor-driving circuit 9 can be configured at a low cost.

Further, according to the first embodiment, the maximal value of the generator current Ig which is outputted from the AC generator 2 is set at a value not larger than the predetermined limit Igmax. Even if the power demand from the load 11 is abruptly increased, this arrangement can obviate drawbacks such as lowering of the fuel efficiency of the engine 1 and forcible suspension of driving of the engine 1.

Further, according to the first embodiment, the maximal value of the battery current Ib and the maximal value of the amplitude of the capacitor current Ic are respectively set at values not larger than the limits Ibmax and Icmax. Even if the power demand from the load 11 is abruptly increased, this arrangement can obviate drawbacks such as shortening of the useful life of the battery 4 and the capacitor 6, and lowering of charging/discharging efficiency thereof.

Further, there is proposed a construction machine in which output terminals of a plurality of storage device having input/output characteristics different from each other are directly connected with a DC line to selectively change over the plurality of storage device to be used depending on a varying load characteristic (see Japanese Unexamined Patent Publication No. 2000-295717). Directly connecting the plurality of storage device with the DC line may likely to cause supplying and receiving of power between or among the plurality of storage device. As a result, power distribution is determined by the relation between the terminal voltage of each storage device and the output impedance.

On the contrary, according to the first embodiment of the invention, since the chopper circuit 5 (7) is provided between the battery 4 (capacitor 6) and the DC line 8, there is no likelihood that power is supplied and received between the battery 4 (capacitor 6) and the DC line 8. Thus, this arrangement can obviate a drawback that control efficiency of the power control apparatus is lowered as a whole due to power loss resulting from such power supplying and receiving. Further, power distribution is desirably controlled in such a manner that the battery 4 and the capacitor 6 can attain their respective optimal efficiencies depending on the input/output characteristics thereof.

(b) Second Embodiment

Now, a power control apparatus for use in a hybrid vehicle in accordance with a second embodiment of the invention is described. The electrical configuration of the second embodiment is identical to that of the first embodiment shown in FIGS. 1 and 2 except that the second embodiment is different from the first embodiment in control procedure of the CPU 27 (see FIG. 1) of the power control circuit 23.

Figure 5:
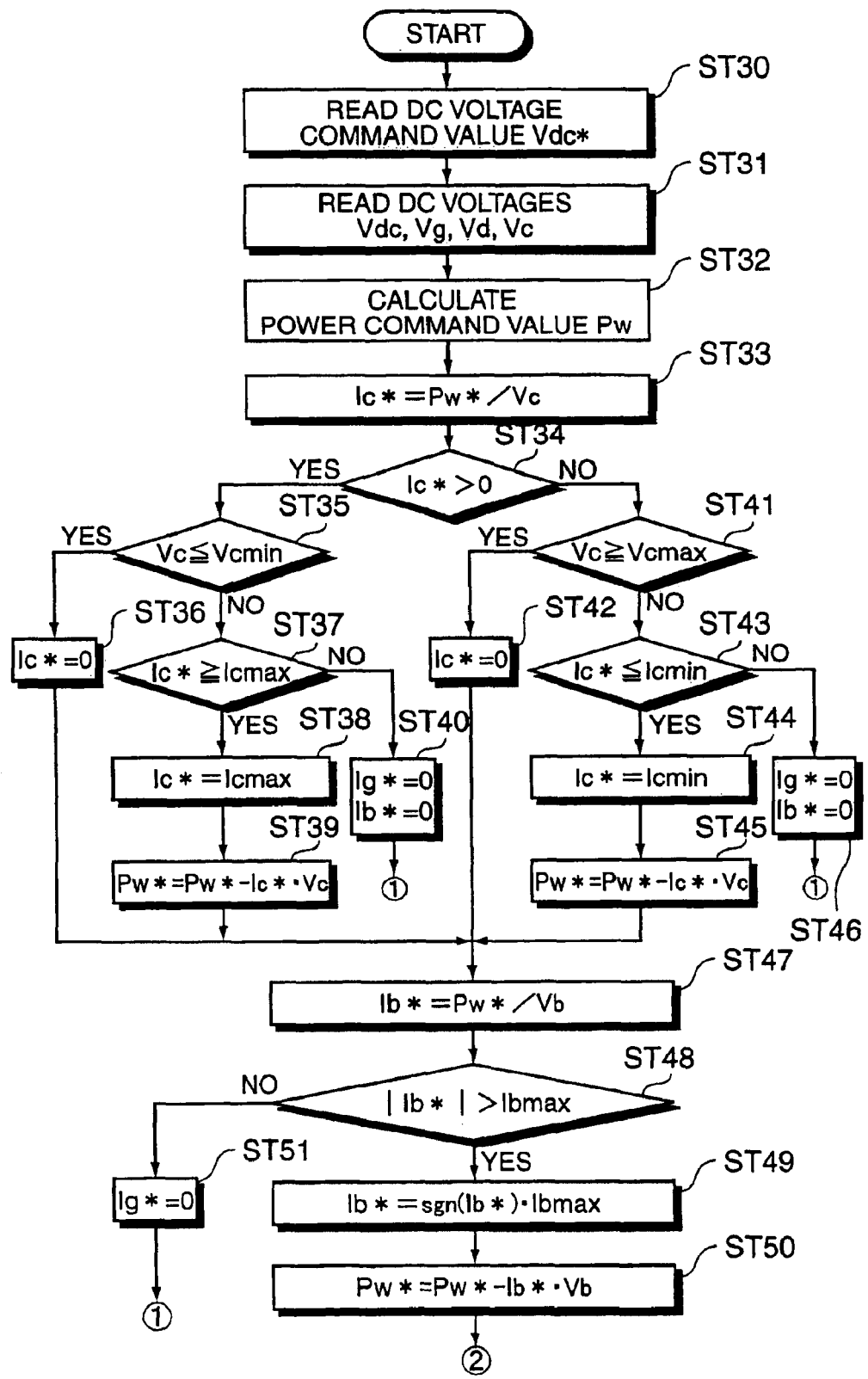
FIG. 5 is a flowchart showing a first half of a control procedure of a CPU of a power control circuit in a second embodiment of the invention.
Figure 6:
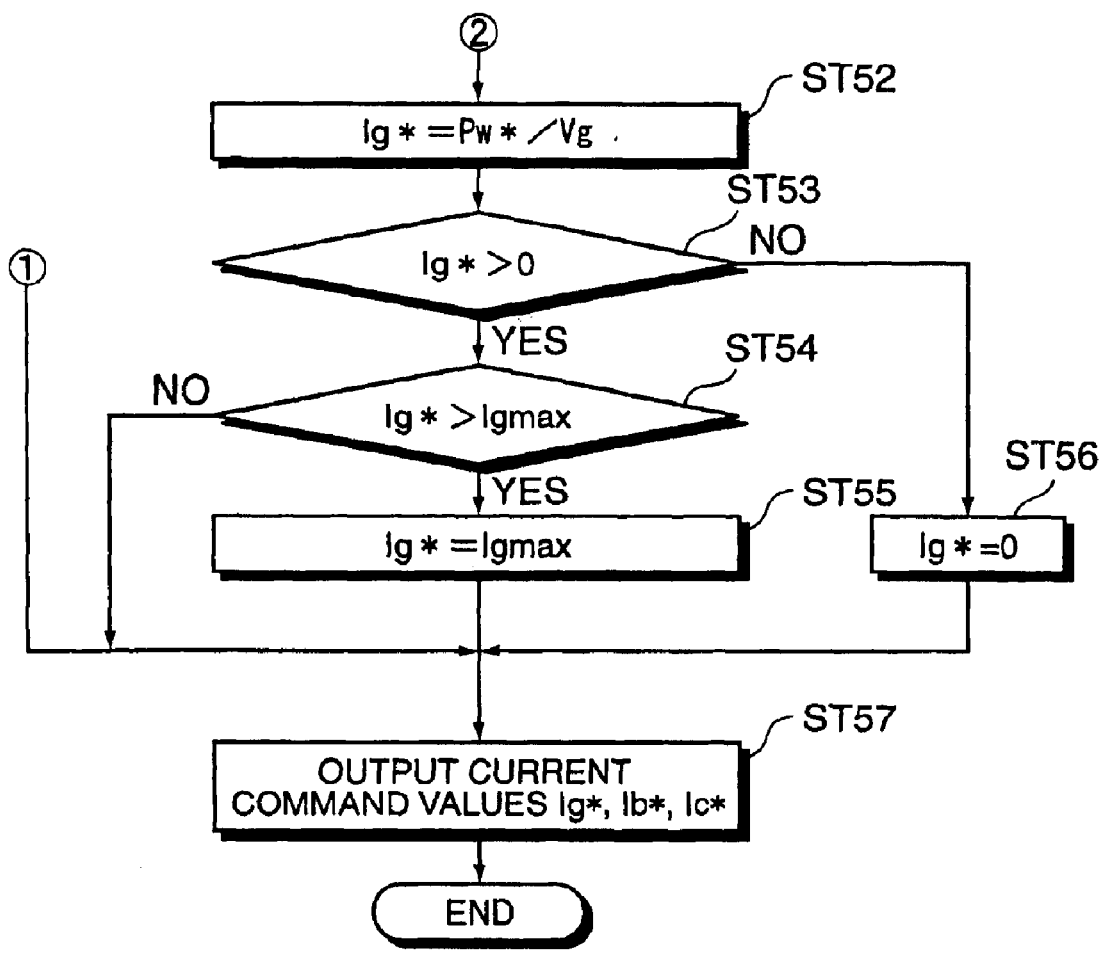
FIG. 6 is a flowchart showing a second half of the control procedure of the CPU of the power control circuit in a second embodiment of the invention.

FIGS. 5 and 6 are flowcharts of the control procedure of a CPU 27 of a power control circuit 23 in the second embodiment.

Referring to FIG. 5, steps ST30 through ST32 are identical to steps ST1 through ST3 in FIG. 3, and accordingly, description thereof is omitted herein.

In ST33, a capacitor current command value Ic*, which is a command value of a capacitor current Ic flowing in a chopper circuit 7, is calculated by using a capacitor voltage Vc received in ST31 and a power command value Pw* calculated in ST32 by implementing the equation (13):

$$Ic^* = Pw^*/Vc \tag{13}$$

Subsequently, in ST34, it is judged whether the polarity of the capacitor current command value Ic* is positive or negative, namely, IC*>0. Here in the second embodiment, the polarity of the capacitor current command value Ic* is positive when a capacitor 6 is discharged, whereas the polarity thereof is negative when the capacitor 6 is charged.

If it is judged that the polarity of the capacitor current command value Ic* is positive, namely, the capacitor 6 is discharged (YES in ST34), then, it is judged whether the capacitor voltage Vc is not larger than a predetermined minimal value Vcmin. If it is judged that Vc≦Vcmin (YES in ST35), the capacitor current command value Ic*=0 (in ST36), and the routine proceeds to ST47. At this time, the capacitor 6 is not discharged because the judgment result shows that the capacitor voltage Vc of the capacitor 6 is too low. Therefore, demanded power is supplied either from a battery 4 or from an AC generator 2 or both from the battery 4 and the AC generator 2, which will be described later.

On the other hand, if it is judged that Vc>Vcmin (NO in ST35), it is judged whether the capacitor current command value Ic* is not smaller than a predetermined maximal value Icmax (in ST37). If it is judged that Ic*≧Icmax (YES in ST37), the maximal value Icmax is set as the capacitor current command value Ic* (in ST38), and a value which is obtained by subtracting the maximal value of the capacitor power, namely, Icmax·Vc, from the power command value Pw* is redefined as the power command value Pw* by implementing the equation (14) (in ST39):

$$Pw^* = Pw^* - Ic^* \cdot Vc \tag{14}$$

Power corresponding to the power command value Pw* is supplied either from the battery 4 or from the AC generator 2 or both from the battery 4 and the AC generator 2, which will be described later.

On the other hand, if it is judged that Ic*<Icmax (NO in ST37), a generator current command value Ig* and a battery current command value Ib* are respectively set at 0 (in ST40) because power supplied by discharging of the capacitor 6 is sufficiently large to provide demanded power from the load. Then, this routine goes to ST57.

In ST34 where it is judged whether the polarity of the capacitor current command value Ic* is positive or negative, judgment that the polarity is negative, namely, the capacitor 6 is charged means that there exists surplus power. In such a case (NO in ST34), it is judged in ST41 whether the capacitor voltage Vc exceeds the predetermined maximal value Vcmax. If it is judged that Vc≧Vcmax (YES in ST41), the capacitor current command value Ic*=0 (n ST42), and the routine proceeds to ST47. At this time, the capacitor 6 is not charged because the judgment result shows that the capacitor voltage Vc of the capacitor 6 is too high. Surplus power is used for charging the battery 4, which will be described later.

On the other hand, if it is judged that Vc<Vcmax (NO in ST41), then, it is judged whether the capacitor current command value Ic* is not larger than the predetermined minimal value Icmin (in ST43). If it is judged that Ic*≦Icmin (YES in ST43), the minimal value Icmin is set as the capacitor current command value Ic* (in ST44), and a value which is obtained by subtracting the minimal value of the capacitor power, namely, Icmin·Vc, from the power command value Pw* is redefined as the power command value Pw* by implementing the equation (15) (in ST45):

$$Pw^* = Pw^* - Ic^* \cdot Vc \qquad (15)$$

Surplus power is used for charging the battery 4, which will be described later.

On the other hand, if it is judged that Ic*>Icmin (NO in ST43), the generator current command value Ig* and the battery current command value Ib* are respectively set at 0 (in ST46) because the capacitor 6 is sufficiently charged, and there is no need of using the surplus power. Then, the routine goes to ST57.

As mentioned above, the capacitor current command value Ic* is calculated by implementing steps ST33 through ST46.

Judgment in ST34 that the polarity of the capacitor current command value Ic* is positive, namely, the capacitor 6 is discharged means that the discharged power is supplied to the load 11 by way of the DC line 8. There may be a case that power discharged from the capacitor 6 is not sufficiently large to provide demanded power from the load 11. In such a case, power in shortage is supplied either from the battery 4 or from the AC generator 2, or both from the battery 4 and the AC generator 2.

On the other hand, judgment in ST34 that the polarity of the capacitor current command value Ic* is negative, namely, the capacitor 6 is charged means that surplus power is supplied from the DC line 8 to the capacitor 6 since the load 11 is a light load. In such a case, since the battery 4 and the capacitor 6 serve as means for charging, the surplus power is handled (namely, the battery 4 is charged) in the case where there still remains surplus power after charging the capacitor 6.

Steps ST47 through ST50 are identical to steps ST11 through ST14 in FIG. 3. In ST50, a value which is obtained by subtracting a maximal value of the battery power, namely, Ibmax·Vb, from the power command value Pw* is redefined as the power command value Pw* by implementing the equation (16):

$$Pw^* = PW^* - Ib^* \cdot Vb \qquad (16)$$

Power corresponding to the power command value Pw* is supplied from the AC generator 2, which will be described later.

On the other hand, in ST48, if it is judged that the amplitude (absolute value) of the battery current command value Ib* does not exceed a predetermined maximal value Ibmax (NO in ST48), the generator current command value Ig* is set at 0 (in ST51) because power supply from the AC generator 2 is not necessary. Then, this routine goes to ST57.

Next, in ST52, the generator current command value Ig* which is outputted to a chopper circuit 20 of a generator power converting circuit 3 is calculated by implementing the equation (17):

$$Ig^* = Pw^*/Vg \qquad (17)$$

Next, in ST53, it is judged whether the polarity of the generator current command value Ig* is positive or negative.

If it is judged that Ig*≦0 (NO in ST53), the generator power is set at 0 by setting Ig*=0 (in ST56). Then, the routine goes to ST57. This arrangement can obviate a phenomenon that the voltage of a smoothing capacitor 19 is abruptly raised because there is no likelihood that power may be supplied from the DC line 8 to the smoothing capacitor 19 by way of the chopper circuit 20.

On the other hand, if it is judged that Ig*>0 in ST53 (YES in ST53), it is judged whether the calculated generator current command value Ig* exceeds a predetermined limit Igmax (in ST54). If it is judged that the value Ig* exceeds the limit Igmax (Ig*>Igmax) (YES in ST54), the limit Igmax is set as the generator current command value Ig* (Ig*=Igmax) (in ST55). Then, this routine goes to ST57.

In this way, as with the case of the first embodiment, the maximal value of the generator power Pw is controllably regulated by setting the upper limit of the generator current command value Ig* at a value not larger than the limit Igmax. This arrangement can obviate drawbacks such as lowering of the fuel efficiency due to increase of a load of the engine 1 or forcible suspension of driving of the engine 1 due to overload of the engine 1, because there is no likelihood that power to be supplied from the AC generator 2 to the DC line 8 is excessively large.

Next, in ST57, the generator current command value Ig*, the battery current command value Ib* and the capacitor current command value Ic* which have been obtained by implementing the aforementioned steps are respectively sent to the chopper circuits 20, 5, 7 by way of the power control circuit 23.

The generator current Ig, the battery current Ib, and the capacitor current Ic are so controlled as to cause these currents Ig, Ib, Ic to follow the current command values Ig*, Ib*, Ic*, respectively by the chopper circuit 20, 5, 7. As a result of the control, even if consumption power of the load 11 is varied depending on an operation of the load 11, the voltage Vdc of the DC line 8 is securely maintained at a constant level.

According to the second embodiment, as with the case of the first embodiment, calculated are the generator current command value Ig*, the battery current command value Ib*, and the capacitor current command value Ic* required for satisfying the power command value Pw* so as to controllably allow currents corresponding to the current command values Ig*, Ib*, Ic* to flow. With this arrangement, even if power demand for driving the load 11 is greatly varied, the voltage Vdc of the DC line 8 can be maintained at a substantially constant value, namely, at a value approximate to the voltage command value Vdc*. Thus, a similar effect as the first embodiment is obtainable in the second embodiment.

Further, according to the second embodiment, the current command values are calculated in the order of the capacitor current command value Ic*, the battery current command value Ib*, and the generator current command value Ig*, which is different from the order in the first embodiment. Namely, charging/discharging of the capacitor 6 comes first in the second embodiment. With this arrangement, even if power demand from the load 11 to the DC line 8 is abruptly increased, such power demand is properly satisfied by charging operation of the capacitor 6 having a higher charging ability per unit time than the battery 4. Accordingly, variation of the voltage Vdc of the DC line 8 can be more effectively suppressed. Thus, in the second embodiment, power distribution is controlled in such a manner that the battery 4 and the capacitor 6 can attain their respective optimal efficiencies depending on input/output characteristics of the battery 4 and the capacitor 6. It should be noted that when the load 11 receives power supply from the DC line 8, discharging of the capacitor 6 is carried out prior to receiving of the power by the load 11, thereby having sufficient charging ability to cope with a case that charging operation is required as a result of sharp rise of power demand from the load 11 to the DC line 8.

Further, according to the second embodiment, since the voltage Vc of the capacitor 6 is so regulated as to fall in a range having the predetermined minimal value Vcmin and the predetermined maximal value Vcmax, the useful life of the capacitor 6 can be further extended, compared with the first embodiment.

In the foregoing embodiments, described is the arrangement equipped with a single set of the load 11, the motor 10, and the generator-driving circuit 9. This invention is not limited to the foregoing embodiments. A similar effect as in the foregoing embodiments is obtained in an arrangement equipped with two or more sets of the above components.

Further, in the above embodiments, described is the arrangement where the battery 4 and the capacitor 6 constitute the storage device. This invention is not limited to the above embodiments. Alternatively, the storage device may have at least one of a battery and a capacitor. For instance, alternatively proposed are an arrangement provided with a plurality of batteries including a battery 4, an arrangement provided with a plurality of capacitors including a capacitor 6, an arrangement provided with a plurality of batteries and a plurality of capacitors, an arrangement merely provided with a battery 4, and an arrangement merely provided with a capacitor 6.

Further, in the above embodiments, the actuator 13 may be a hydraulic motor for a running body or a swing body to drive, e.g., a crawler. Further, in the above embodiments, the load 11 may be a reducer in case of directly driving a crawler by a motor or a case of driving wheels of a generally available hybrid vehicle.

(c) Third Embodiment

Figure 7:
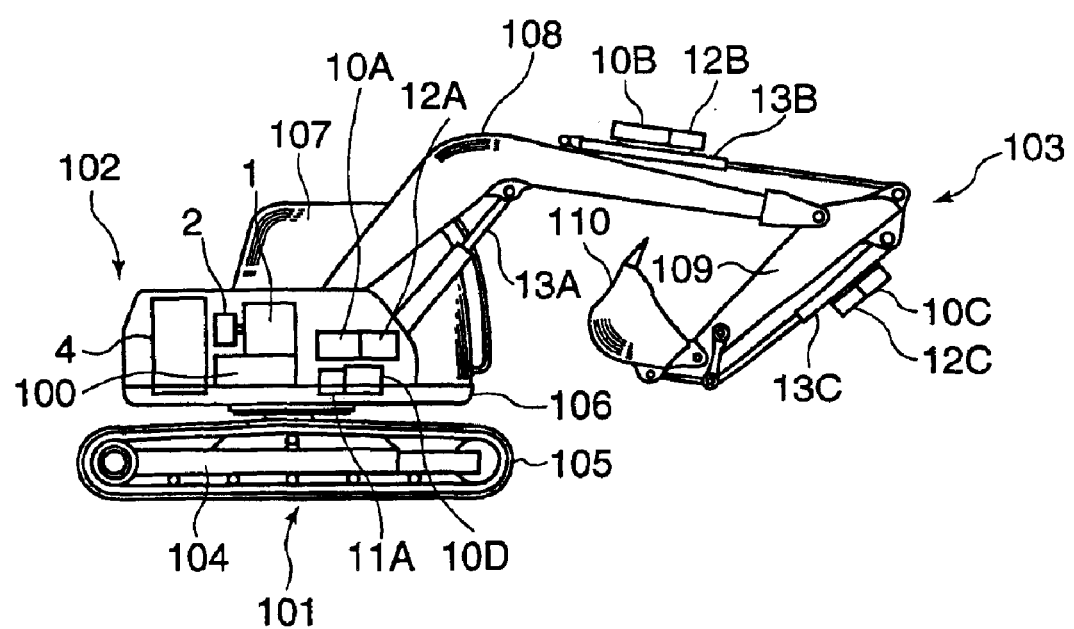
FIG. 7 is a diagram showing the entirety of a hybrid hydraulic excavator as an embodiment of a hybrid construction machine in accordance with the invention.
Figure 8:
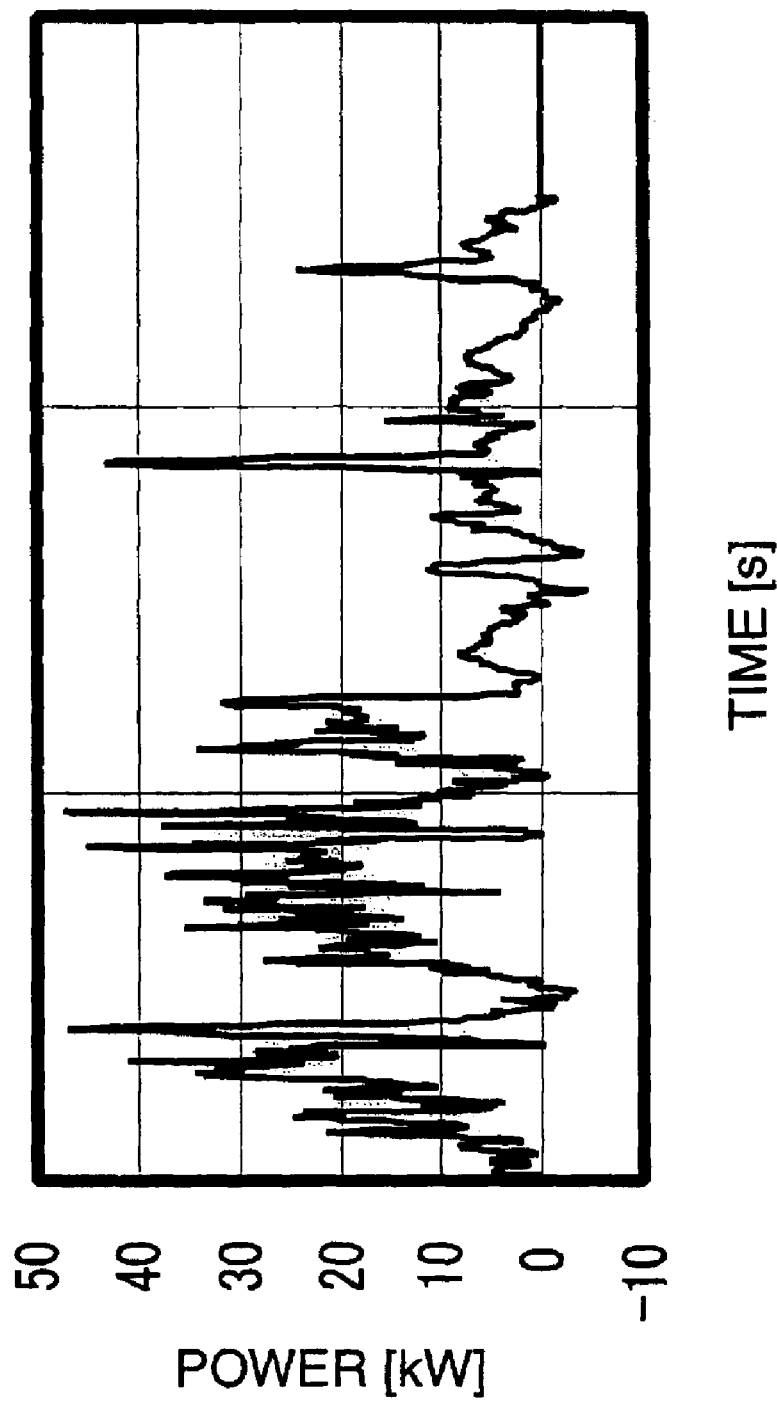
FIG. 8 is a graph showing an example of change of power demand from a load with time at the time of excavating and charging by a hydraulic excavator.

Next, an embodiment of a hybrid construction machine according to this invention is described as a third embodiment of the invention. FIG. 7 is a diagram showing an entire construction of a hybrid hydraulic excavator as the third embodiment. It should be noted that elements of the third embodiment identical to those of the first embodiment are denoted at the same reference numerals.

The hydraulic excavator is comprised of, as shown in FIG. 7, a lower traveling body 101, an upper rotating body 102, and an excavation attachment 103 which is mounted on a front part of the upper rotating body 102. The hydraulic excavator further comprises a power control apparatus in accordance with the first embodiment of the invention.

The lower traveling body 101 includes a right-side crawler frame 104 and a left-side crawler frame 105 provided laterally at the opposite sides thereof (in FIG. 7, only one of the crawler frames is illustrated). The crawler frames 105 (sic) are individually rotated by motors (not shown) for driving the running body.

The upper rotating body 102 is comprised of a rotating frame 106 and a cabin 107. On the rotating frame 106, mounted are an engine 1 as a power source, an AC generator 2 driven by the engine 1, a battery 4, a motor 10D for driving the upper rotating body 102, a reducer 11A which reduces rotating force of the swing-driving motor 10D to transmit the rotating force to a swing mechanism (swing gear), a motor 10A for driving a boom, a hydraulic pump 12A which is rotated by the boom-driving motor 10A, and an electrical circuit section 100.

The excavation attachment 103 is comprised of a boom 108, a boom cylinder 13A which is operatively expanded and contracted in response to hydraulic oil supplied from the boom-driving hydraulic pump 12A to move the boom up and down, an arm 109, an arm cylinder 13B for pivoting the arm 109, a bucket 110, and a bucket cylinder 13C for operating the bucket 110.

An arm-driving motor 10B and an arm-driving hydraulic pump 12B which is driven by the motor 10B are mounted on the arm cylinder 13B of the excavation attachment 103. A bucket-driving motor 10C and a bucket-driving hydraulic pump 12C which is driven by the motor 10C are mounted on the bucket cylinder 13C.

To summarize this embodiment, the hydraulic excavator in accordance with this embodiment is comprised of the electric circuit section 100 corresponding to the electric circuit section 100 of the first embodiment; the boom-driving motor 10A, the arm-driving motor 10B, the bucket-driving motor 10C, the swing-driving motor 10D, and the pair of running-driving motors (not shown) which correspond to the motor 10 (see FIG. 1) of the first embodiment; the reducer 11A corresponding to the load 11 (see FIG. 1); the boom-driving hydraulic pump 12A, the arm-driving hydraulic pump 12B, and the bucket-driving hydraulic pump 12C which correspond to the hydraulic pump 12 (FIG. 1); and the boom cylinder 13A, the arm cylinder 13B, and the bucket cylinder 13C which correspond to the actuator 13 (see FIG. 1).

According to this embodiment, the hydraulic excavator having a similar effect as in the first embodiment is attained. Alternatively, the hydraulic excavator in accordance with the third embodiment may be loaded with the power control apparatus in accordance with the second embodiment, in place of the power control apparatus in accordance with the first embodiment. Further, in this embodiment, a hybrid hydraulic excavator is described as an example of the inventive hybrid construction machine. Alternatively, this invention can be applied to other hybrid construction machines such as a hybrid hydraulic crane.

Exploitation in Industry

As mentioned above, this invention is useful in various hybrid vehicles loaded with an engine and an electric motor to drive a load by the motor. Particularly, this invention is suitable for use in construction machines such as hydraulic excavators and hydraulic cranes in which a load is varied during operation of the machine.

What is claimed is:

1. A power control apparatus for a hybrid vehicle provided with an engine, a generator driven by the engine, at least one storage device, an electric motor driven by electric power supplied from at least one of the generator and the storage device, and a load operated by the motor as a drive source, the power control apparatus comprising:

a first power converter provided between said generator and a direct-current line for converting the power outputted from the generator to DC power to output the DC power to said direct-current line;

at least one second power converter provided between said storage device and said direct-current line for converting the power outputted from said storage device to DC power to output the DC power to said direct-current line;

a motor driver electrically connected with said direct-current line for driving said motor based on the power supplied by way of the direct-current line; and a power controller for controlling said first power converter and said second power converter to output DC power corresponding to demanded power for said load by way of said motor to said direct-current line, wherein said power controller controls said first power converter and said second power converter to maintain a voltage of said direct-current line at a substantially constant level irrespective of wide variation of the demanded power for said load.

2. A power control apparatus for a hybrid vehicle according to claim 1, wherein said power controller controls said first power converter to output the DC power of a value not larger than a predetermined value.

3. A power control apparatus for a hybrid vehicle according to claim 1, wherein said power controller controls said storage device to discharge an electric current of a value not larger than a predetermined value and to charge an electric current of a value not larger than a predetermined value.

4. A power control apparatus for a hybrid vehicle according to claim 1, wherein said power controller controls said second power converter to output the DC power in such a manner that said storage device outputs a DC voltage of a value not larger than a predetermined value.

5. A power control apparatus for a hybrid vehicle according to claim 1, wherein said power controller controls said second power converter to output the DC power in such a manner that said storage device outputs a DC voltage of a value not smaller than a predetermined value.

6. A power control apparatus for a hybrid vehicle according to claim 1, wherein said power controller controls said second power converter to output the DC power in such a manner that electric energy stored in said storage device lies in a predetermined range.

7. A power control apparatus for a hybrid vehicle according to claim 1, wherein said power controller includes a first controller for sending an electrical command signal to said first power converter, and a second controller for sending an electrical command signal to said second power converter;

said first power converter outputs the DC power responsive to the electrical command signal from said first controller;

said second power converter outputs the DC power responsive to the electrical command signal from said second controller; and each of said first controller and said second controller sends the electrical command signal operative to maintain the voltage of said direct-current line at a substantially constant level.

8. A power control apparatus for a hybrid vehicle according to claim 1, further comprising a plurality of said storage device, and a plurality of said second power converter corresponding to said plurality of storage device in number.

9. A power control apparatus for a hybrid vehicle according to claim 8, wherein said power controller controls said plurality of second power converter in accordance with a predetermined order or priority based on input/output characteristics of each of said plurality of storage device in controlling said plurality of second power converter in response to the demanded power for said load.

10. A power control apparatus for a hybrid vehicle according to claim 1, wherein said load includes an actuator for actuating a working attachment mounted on a main body of the hybrid vehicle.

11. A hybrid construction machine comprising:

an engine;

a generator driven by the engine;

a storage device;

an electric motor driven by electric power supplied from at least one of the generator and the storage device;

a load including an actuator for actuating a working attachment; and a power control apparatus including:

a first power converter provided between said generator and a direct-current (DC) line for converting the power output from the generator to DC power to output the DC power to said DC line;

a second power converter provided between said storage device and said DC line for converting the power output from said storage device to DC power to output the DC power to said DC line;

a motor driver electrically connected with said DC line for driving said motor based on the power supplied by way of the DC line; and a power controller for controlling said first power converter and said second power converter to output DC power corresponding to demanded power for said actuator by way of said motor to said DC line, said power controller controlling said first power converter and said second power converter to maintain a voltage of said DC line at a substantially constant level irrespective of wide variation of the demanded power for said load.

12. A hybrid construction machine according to claim 11, wherein said power controller controls said first power converter to output the DC power of a value not larger than a predetermined value.

13. A hybrid construction machine according to claim 11, wherein said power controller controls said storage device to discharge an electric current of a value not larger than a predetermined value and to charge an electric current of a value not larger than a predetermined value.

14. A hybrid construction machine according to claim 11, wherein said power controller controls said second power converter to output the DC power in such a manner that said storage device outputs a DC voltage of a value not larger than a predetermined value.

15. A hybrid construction machine according to claim 11, wherein said power controller controls said second power converter to output the DC power such that said storage device outputs a DC voltage of a value not smaller than a predetermined value.

16. A hybrid construction machine according to claim 11, wherein said power controller controls said second power converter to output the DC power such that electric energy stored in said storage device lies in a predetermined range.

17. A hybrid construction machine according to claim 11, wherein said power controller includes a first controller for sending an electrical command signal to said first power converter, and a second controller for sending an electrical command signal to said second power converter;

said first power converter outputs the DC power responsive to the electrical command signal from said first controller;

said second power converter outputs the DC power responsive to the electrical command signal from said second controller; and each of said first controller and said second controller sends the electrical command signal operative to maintain the voltage of said DC line at a substantially constant level.

18. A hybrid construction machine according to claim 11, further comprising a plurality of said storage devices, and a plurality of said second power converters corresponding to said plurality of storage devices in number.

19. A hybrid construction machine according to claim 18, wherein said power controller controls said plurality of second power converters in accordance with a predetermined order or priority based on input/output characteristics of each of said plurality of storage devices in controlling said plurality of second power converters in response to demanded power for said actuator.

20. A power control apparatus for a hybrid vehicle provided with an engine, a generator driven by the engine, at least one storage device, an electric motor driven by electric power supplied from at least one of the generator and the storage device, and a load operated by the motor as a drive source, the power control apparatus comprising:
   a first power converter provided between said generator and a direct-current line for converting the power outputted from the generator to DC power to output the DC power to said direct-current line;
   at least one second power converter provided between said storage device and said direct-current line for converting the power outputted from said storage device to DC power to output the DC power to said direct-current line;
   a motor driver electrically connected with said direct-current line for driving said motor based on the power supplied by way of the direct-current line; and
   a power controller for controlling said first power converter and said second power converter to output DC power corresponding to demanded power for said load by way of said motor to said direct-current line, wherein said power controller controls said first power converter and said second power converter to maintain a voltage of said direct-current line at a substantially constant level irrespective of wide variation or drastic change of the demanded power for said load.

21. A hybrid construction machine comprising:
   an engine;
   a generator driven by the engine;
   a storage device;
   an electric motor driven by electric power supplied from at least one of the generator and the storage device;
   a load including an actuator for actuating a working attachment; and
   a power control apparatus including:
      a first power converter provided between said generator and a direct-current (DC) line for converting the power output from the generator to DC power to output the DC power to said DC line;
      a second power converter provided between said storage device and said DC line for converting the power output from said storage device to DC power to output the DC power to said DC line;
      a motor driver electrically connected with said DC line for driving said motor based on the power supplied by way of the DC line; and
      a power controller for controlling said first power converter and said second power converter to output DC power corresponding to demanded power for said actuator by way of said motor to said DC line, said power controller controlling said first power converter and said second power converter to maintain a voltage of said DC line at a substantially constant level irrespective of wide variation or drastic change of the demanded power for said load.

* * * * *